United States Patent [19]

Zurek et al.

[11] Patent Number: 5,369,990
[45] Date of Patent: Dec. 6, 1994

[54] REMOTE MOUNT AIR FLOW SENSOR

[75] Inventors: Lawrence A. Zurek, Mt. Clemens; Michele T. Kosztowny, Dearborn; Lorna J. Clowater, Canton, all of Mich.

[73] Assignee: Ford Motor Company, Dearborn, Mich.

[21] Appl. No.: 43,718

[22] Filed: Apr. 8, 1993

[51] Int. Cl.⁵ .................................. G01F 1/68
[52] U.S. Cl. .......................... 73/118.2; 73/204.22
[58] Field of Search ............. 73/118.2, 866.5, 202.5, 73/204.11, 204.22

[56] References Cited

U.S. PATENT DOCUMENTS

| | | | |
|---|---|---|---|
| 4,393,697 | 7/1983 | Sato et al. | 73/118 |
| 4,578,996 | 4/1986 | Abe et al. | 73/118.2 |
| 4,599,894 | 7/1986 | Lenz | 73/118.2 |
| 4,884,215 | 11/1989 | Zboralski et al. | 73/118.2 |
| 4,907,446 | 3/1990 | Inada et al. | 73/118.2 |
| 4,911,009 | 3/1990 | Maeda et al. | 73/204.11 |
| 4,922,879 | 5/1990 | Kaji et al. | 73/118.2 |
| 5,186,044 | 2/1993 | Igarashi et al. | 73/204.22 |
| 5,231,871 | 8/1993 | Arai et al. | 73/118.2 |

Primary Examiner—Hezron E. Williams
Assistant Examiner—George M. Dombroske
Attorney, Agent, or Firm—Roger L. May; Peter Abolins

[57] ABSTRACT

A remote mount mass air flow sensor that has a mass air flow sensor fixedly mounted on a sensor mount. The sensor mount has an isolation air flow conduit in which is received the sensing head of the mass air flow sensor. The remote mount mass air flow sensor may be mounted directly on a sensor housing forming part of the main air duct of an air intake system of an internal combustion engine.

14 Claims, 3 Drawing Sheets

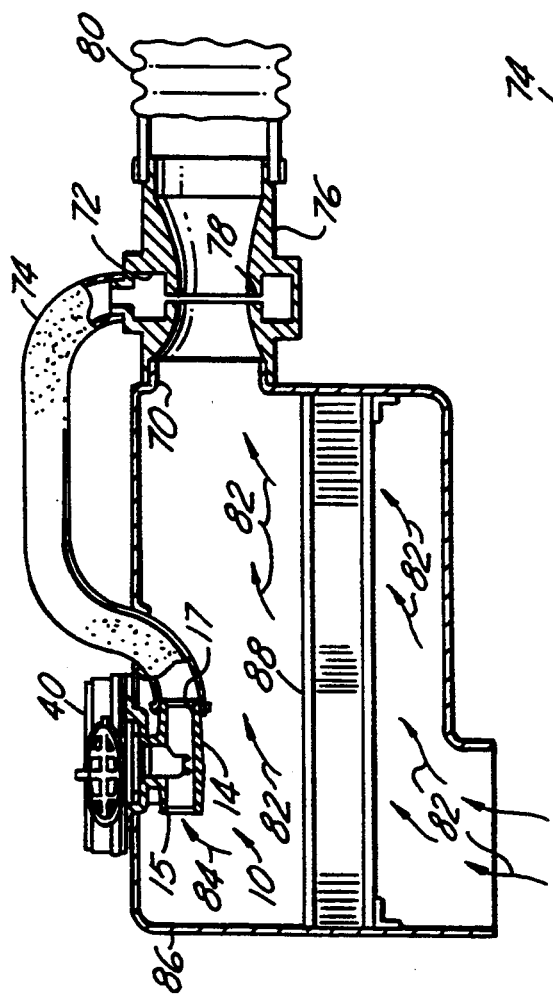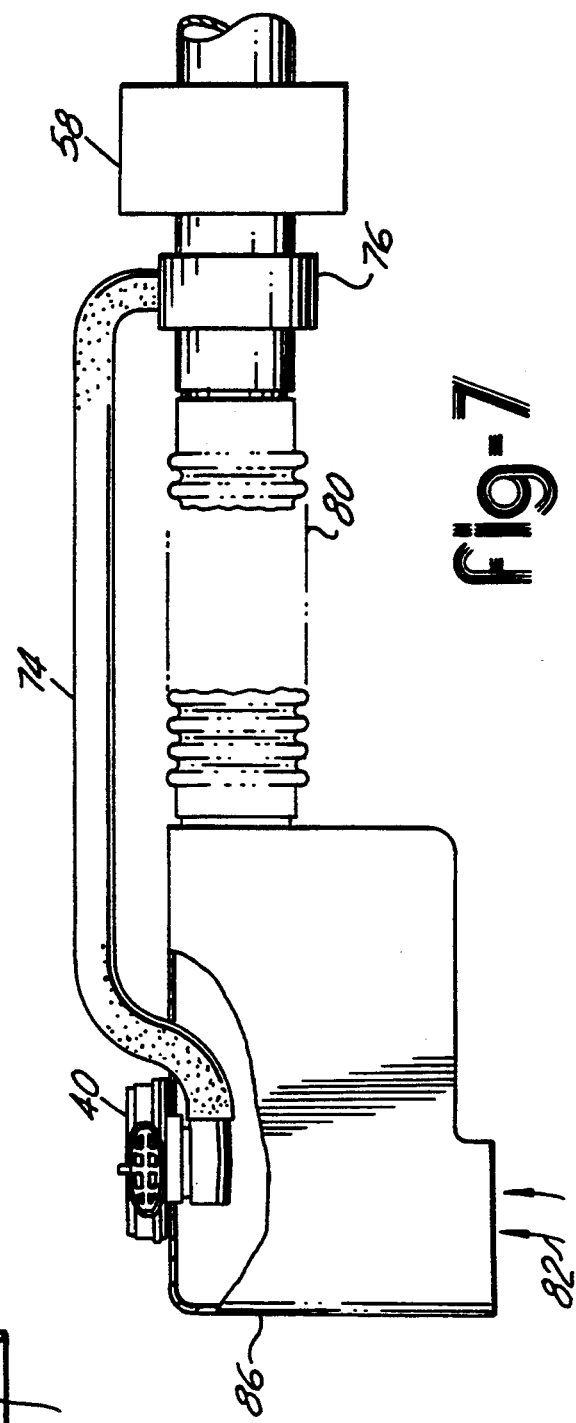

REMOTE MOUNT AIR FLOW SENSOR

TECHNICAL FIELD

The invention is related to mass air flow sensors and, in particular, to mounting structure for the mass air flow sensors in the air intake system of an internal combustion engine.

BACKGROUND ART

The prior art as disclosed by Sato et al in U.S. Pat. No. 4,393,697 teaches the mounting of the mass air flow sensor directly on the main venturi member of the air intake system of an internal combustion engine. The main venturi member has a bypass passage connected at its downstream end to the low pressure region at the narrowed portion of the venturi. The sensing elements of the mass air flow sensor are disposed in this bypass passage and measures the air flow therethrough.

In an alternate embodiment taught by Sato et al, the body of the mass air flow sensor has a through air flow channel which is disposed directly into the main air flow of the air intake system. The sensing elements of the mass air flow sensor are located in the through air flow channel in the same manner as they are located in the bypass channel and the components of the electronic circuit are mounted on the external portion of the body of the mass air flow sensor.

In a current automotive application shown in FIG. 1, the mass air flow sensor 1 is mounted directly on a sensor housing 2 which forms part of the air intake or induction system of an internal combustion engine. The sensor housing 2 has a main air flow passageway 3 extending the length thereof and a smaller diameter air flow passageway 4 offset to one side of the main air flow passageway 3. The sensing head 5 of the mass air flow sensor 1 extends into the smaller diameter air flow channel 4 and detects the air flow therethrough. The sensor housing 2 also has a diametrically disposed internal wing 6 which produces a pressure differential across smaller diameter air flow channel 4 enhancing the air flow therethrough.

This mounting arrangement of the mass air flow sensor has several drawbacks. The sensor housing 2 with the integral smaller air flow channel 4 and the wing 6 is a complex part and relatively expensive to manufacture. Also, the manufacturing tolerances of the sensor housing 2 results in variations in the flow pattern in the smaller air flow channel 4. These variations in the flow pattern in the smaller air flow channel 4 adversely affect the calibration accuracy of the mass air flow sensor 1 once installed on a particular sensor housing 2.

SUMMARY OF THE INVENTION

The remote mount mass air flow sensor assembly consists of a sensor mount mountable to the air intake system of an internal combustion engine and a mass air flow sensor fixedly mounted on the sensor mount. The sensor mount has a substantially flat mounting plate, an air flow conduit and a neck portion connecting the air flow conduit to the mounting plate. The mounting plate has a depressed well, the air flow conduit has a centrally disposed internal passageway having an axis substantially parallel to the mounting plate and the neck has a through bore connecting the bottom of the depressed well with the internal passageway.

The mass air flow sensor has a base portion which houses the electronics of the sensor and a sensing head. The base portion is attached to the mounting plate of the sensor mount and the sensing head passes through the bore through the neck and extends into the internal passageway of the air flow conduit.

Means are provided to attach the mass air flow sensor assembly to the air intake system of the internal combustion engine with the air flow conduit having an air flow therethrough, indicative of the mass air flow being inhaled by the engine.

In a first embodiment, the mass air flow sensor assembly is attached to a sensor housing which forms part of the main air duct of the engine's air intake system.

In a second embodiment, the mass air flow sensor assembly is attached to an air filter housing of the engine's air intake system with the air flow conduit disposed in a slow flow region downstream of the filter. The outlet end of the air flow conduit is connected to a low pressure region of a venturi located in the main air duct. This produces an air flow through the air flow conduit which is a function of the mass air flow through the air intake system's main air duct. An annular accumulator may be connected to the low pressure region by an annular slit to reduce the signal-to-noise ratio of the mass air flow sensor resulting from turbulence and pressure fluctuations in the main air duct produced by the opening and closing of the engine air intake valves.

One advantage of the remote mount mass air flow sensor assembly is that the sensor mount becomes part of the mass air flow sensor, eliminating calibration changes of the mass air flow sensor output resulting from tolerance variations in the cross-sectional area of the internal passageway of the air flow conduit.

Another advantage is that the sensor mount is sufficiently small so that it is relatively more simple and less costly to manufacture than the sensor housing having an integral air flow conduit taught by the prior art.

Still another advantage is that the assembly is versatile and may be used either alone or in conjunction with a venturi.

Yet another advantage is that its use in combination with a venturi, the signal-to-noise ratio is substantially improved and results in the mass air flow sensor having an increased dynamic range.

These and other advantages of the remote mount mass air flow sensor assembly, when used alone or in combination with a venturi, will become more apparent from a reading of the specification in conjunction with the drawings.

BRIEF DESCRIPTION OF THE DRAWINGS

FIG. 6 is a partial cross-sectional view showing the remote mount mass air flow sensor assembly mounted on an air filter housing and connected to a venturi attached to the air filter housing; and FIG. 7 shows an alternate arrangement of FIG. 6.

DETAILED DESCRIPTION OF THE PREFERRED EMBODIMENT

Figure 2:
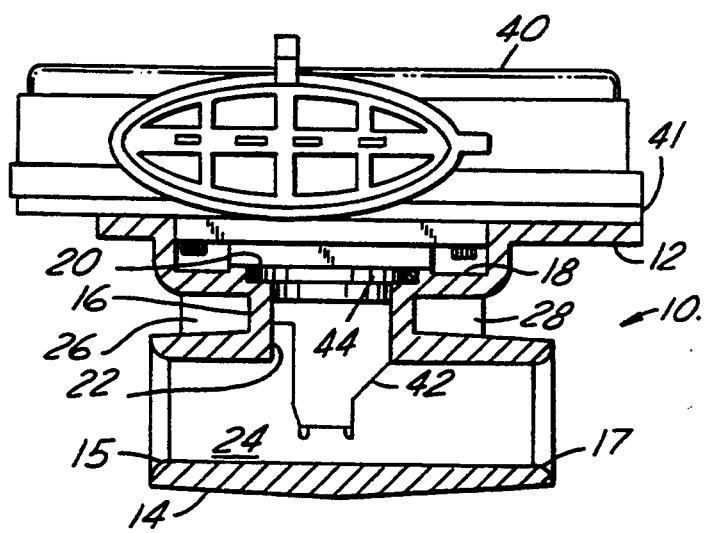
FIG. 2 is a partial cross-section showing the details of the sensor mount.

FIG. 2 shows a cross-section of the preferred embodiment of the sensor mount 10 for a mass air flow sensor 40 having a base 41 and a sensing head 42. The sensor mount 10 has a substantially flat mounting plate 12 connected to an isolated air flow conduit 14 by a substantially cylindrical neck 16. The mounting plate 12 has a depressed circular well 18 in which is received an upper portion of the sensing head 42 of the mass air flow sensor 40. An O-ring seat 20, provided at the bottom of the well 18, sealingly receives an O-ring 44 circumscribing the sensing head 42 as shown. The O-ring 44 prohibits air from flowing into the internal passageway 24 of the air flow conduit 14 from the well 18. The cylindrical neck 16 has a through bore 22 connecting the bottom of the well 18 with the internal passageway 24 defined by the air flow conduit 14. The internal passageway 24 preferably is substantially parallel to the mounting plate 12. The sensing head 42 of the mass air flow sensor 40 extends through the bore 22 into the internal passageway 24 of the isolated air flow conduit 14 approximately midway between its inlet end 15 and its outlet end 17. A pair of webs 26 and 28 are provided on opposite sides of the neck 16 to reduce the turbulence of the air flow around the sensor mount 10 in the vicinity of the air flow conduit 14 and neck 16.

Figure 3:
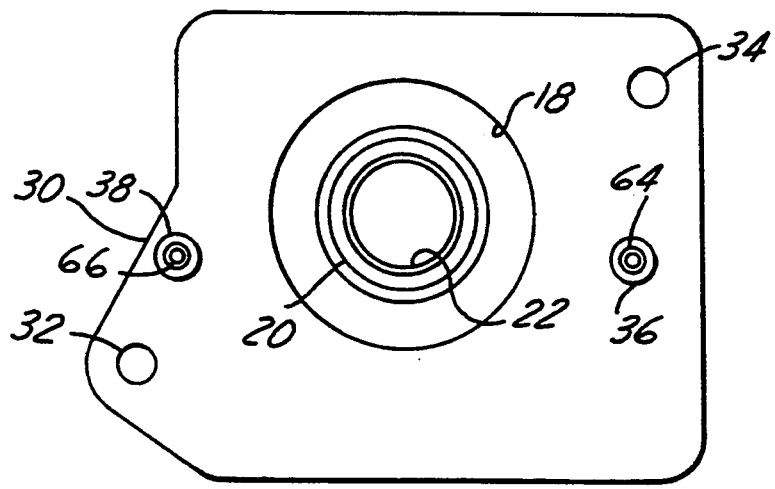
FIG. 3 is a top view of the sensor mount.
Figure 4:
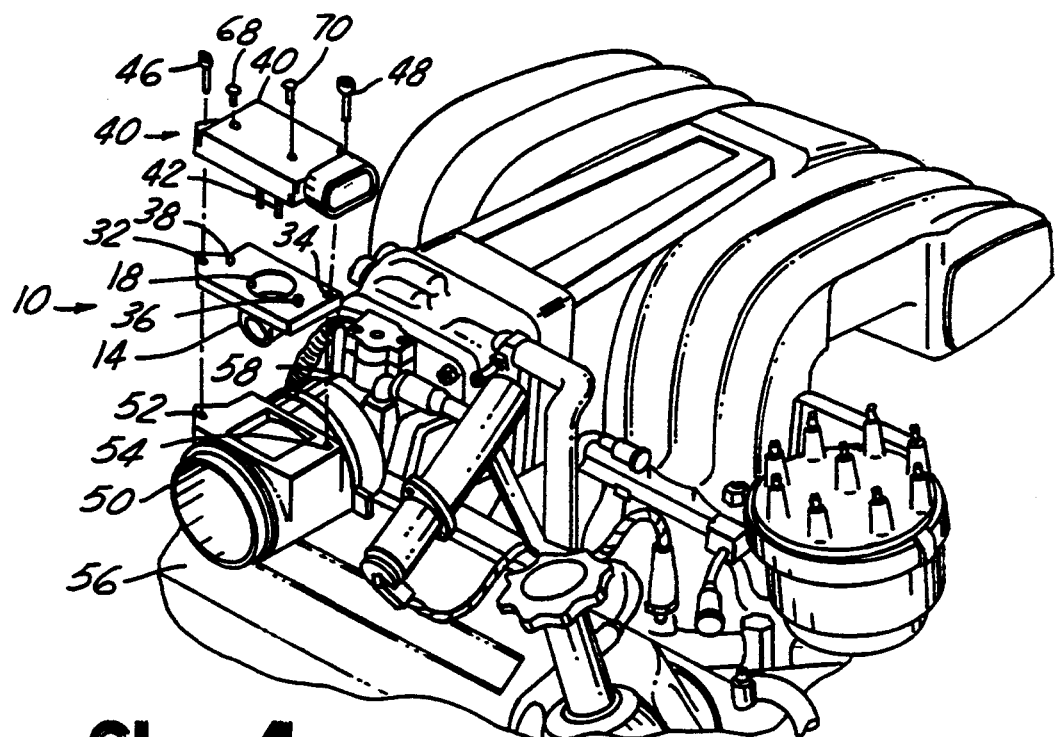
FIG. 4 is an exploded view showing the mounting of the remote mount mass air flow sensor assembly in the air intake system of an internal combustion engine.
Figure 5:
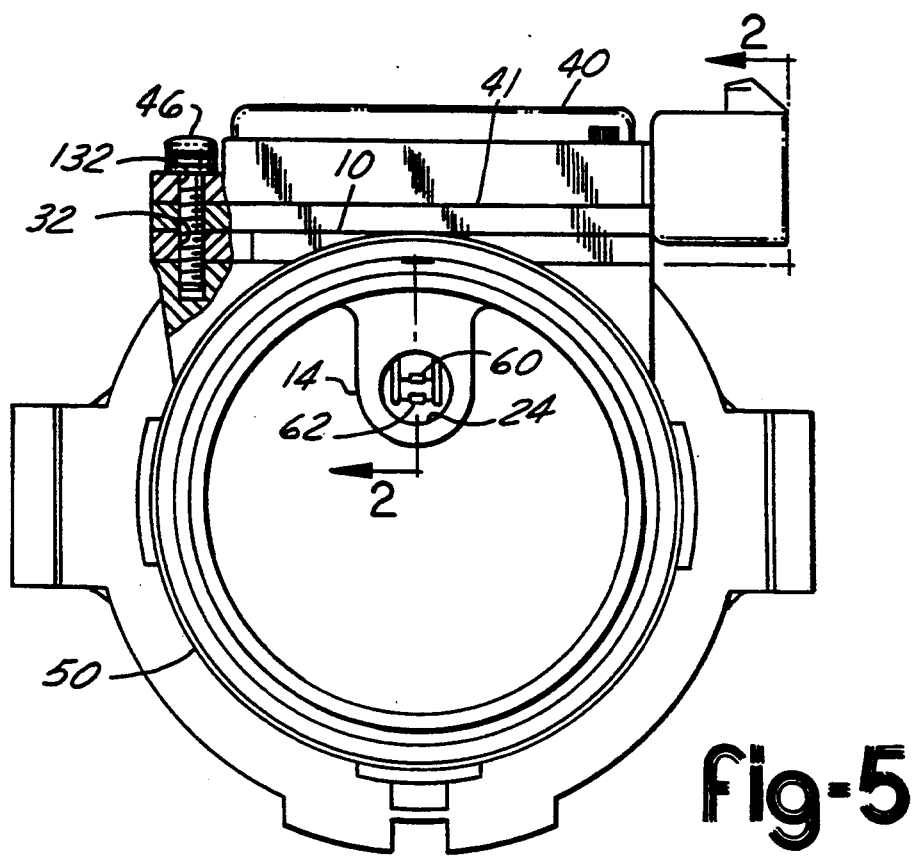
FIG. 5 is a front view showing the remote mount mass air flow sensor on a sensor housing.

A plan view of the sensor mount 10 is shown in FIG. 3. The mounting plate 12 has a generally rectangular shape having a triangular tab 30 projecting from one edge thereof. The triangular tab 30 has a first mounting aperture 32 which mates with a mounting aperture 132 provided on the mass air flow sensor 40 as shown in FIG. 5. A second mounting aperture 34 is provided on the opposite side of the well 18 diametrically opposite mounting aperture 32. The second mounting aperture 34 mates with a corresponding mounting aperture, not shown, provided through the mass air flow sensor 40. Fasteners, such as bolts 46 and 48, pass through mounting apertures provided in the mass air flow sensor 40, the mounting apertures 32 and 34 provided in sensor mount 10 and are received in threaded bores 52 and 54 provided in a sensor housing 50. The sensor housing 50, as shown in FIGS. 4 and 5, is part of the main air duct of the air intake system of an internal combustion engine 56 preferably located upstream of a throttle 58.

Returning to FIG. 3, the mounting plate 12 of the sensor mount 10 has a pair of upstanding locating pins 36 and 38 which are received in mating apertures provided in the mass air flow sensor 40. The locating pins 36 and 38 precisely align the mass air flow sensor 40 on the sensor mount 10 so that the sensing elements 60 and 62 are properly aligned to the air flow through the isolated air flow conduit 14 and are centrally disposed in the internal passageway 24 as shown in FIG. 5. The locating pins 36 and 38 have centrally disposed apertures 64 and 66 which receive rivets 65 and 67, respectively, securing the mass air flow sensor 40 to the sensor mount 10.

Figure 1:
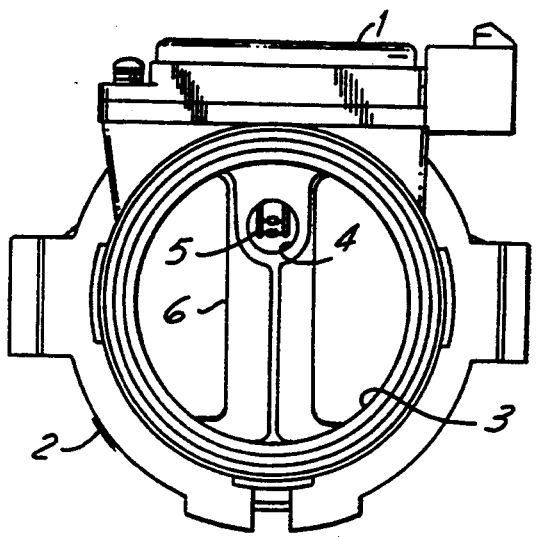
FIG. 1 is a frontal view showing the prior art mounting of a mass air flow sensor on a sensor housing.

The mass air flow sensor 40 is mounted onto the sensor mount 10 prior to its calibration. Thus, the mass air flow sensor 40 and attached sensor mount 10 are calibrated as an assembly. The mass air flow sensor 40 is calibrated with a calibrated air flow flowing through the internal passageway 24 of the air flow conduit 14 to which it is attached. This arrangement eliminates any changes in calibration of the mass air flow sensor 46 due to manufacturing tolerances of the air flow conduit 14 and its internal passageway 24. As a result, the calibrated output signal generated by the mass air flow sensor 40 is independent of the manufacturing tolerances of the air flow conduit 14. This also reduces the cost of the parts because the isolated air flow conduit 14 is no longer a part of the sensor housing 50 as shown in FIG. 1, and the sensor housing 50 has only a simple circular air flow channel. The isolated air flow conduit 14 is now part of the sensor mount 10 which is a significantly smaller component and, is easier to manufacture.

FIG. 6 shows an alternate arrangement for using the mass air flow sensor 40 and the sensor mount 10 to measure the mass air flow in the air intake system of an internal combustion engine. In this alternate arrangement, the mass air flow sensor 40 and the sensor mount 10 are disposed at a location remote from the engine and its air intake manifold such as in the plenum region of an air filter housing 86 of the air intake or air induction system of an internal combustion engine. The air flow conduit 14 of the sensor mount 10 is located in a slow air flow low turbulence region inside of the air filter housing 86, downstream of the air filter 88. The inlet end 15 of the air flow conduit 14 is open to the interior of the filter housing 86 which is substantially at atmospheric pressure. The outlet end 17 of the air flow conduit 14 is connected to a low pressure region of an annular accumulator 72 by a constant diameter pipe or hose 74. Preferably, the annular accumulator 72 is an integral part of a venturi 76. The venturi, as shown, is connected to the output of the air filter housing 86. Alternatively, the venturi may be formed integral with the filter housing 86 making the filter housing and venturi a unitary element.

A spillmouth tap 78 connects the accumulator 68 to a minimum diameter low pressure region of the venturi 76. A flexible hose 80 connected to the output of the venturi 76 forms part of the main duct of the air intake system of the engine.

The venturi 76 need not be connected to the air filter housing 86 as shown in FIG. 6, but may be serially disposed in the main air duct at a location displaced further downstream from the air filter housing 86 and may be located just before the engine's throttle 58 as shown in FIG. 7. The location of the venturi 76 in this embodiment corresponds to the location of the sensor housing 50 as shown in FIG. 4.

The arrows 82 in FIG. 6 indicate the direction of the air flow through the filter housing 86 into the venturi 76 while arrow 84 indicates the direction of air flow through the isolated air flow conduit 14.

This alternate arrangement has the advantage that the sensing head 42 of the mass air flow sensor 40 is placed in slow flow low turbulence region of the total air intake system of the engine. The primary air flow is entrained through the venturi which creates a low pressure region in the vicinity of its minimum diameter. This low pressure region is connected to the outlet end 17 of the air flow conduit of the sensor mount. This slow flow region at the entrance to the air flow conduit 14 is significantly less turbulent than the air flow through the venturi 76 or the air flow through the sensor housing 50 of the arrangement shown in FIGS. 2-5. The reduction in the turbulence of the air flow in the air flow conduit 14 reduces the signal-to-noise ratio of the signal generated by the mass air flow sensor. Further, by appropriate selection of the angle, shape and cross-sectional area of the spillmouth tap 78 and the volume of the annular accumulator 72, the high speed pressure fluctuations in the primary air flow due to turbulence and the opening and closings of the engine's valves can be effectively filtered, further reducing the high frequency fluctuations of the air flow through the air flow conduit 14.

The use of the lower pressure region of the venturi to produce an air flow through the air flow conduit 14 of the sensor mount may also be used to increase the dynamic range of the mass air flow sensor 40 making it applicable to larger and higher performance engines such as truck engines or race car engines. Also, by utilizing the low pressure region created in the venturi 76 to produce an air flow through the air flow tube 14, the mass air sensor 40 will also be sufficiently sensitive to detect changes in the barometric pressure.

Having disclosed the remote mount mass air flow sensor and two different applications of the remote mount mass air flow sensor for measuring the mass air flow in the air intake or induction system of an internal combustion engine, it is not intended to be limited to, the specific arrangements shown in the drawings and discussed in the specification. It is recognized that those skilled in the art may conceive alternate arrangements and make improvements thereto within the scope of the appended claims.

We claim:

1. A mass air flow sensor assembly mountable to the air intake system of an internal combustion engine, comprising:
   a sensor mount having a substantially flat mounting plate portion an air flow conduit having an internal passageway substantially parallel to said flat mounting plate portion, and a neck portion intermediate said air flow conduit and said flat mounting plate portion, said flat mounting plate portion having a sensor head aperture provided therethrough, and said neck portion having a through bore connecting said sensor head aperture to said internal passageway, said mounting plate portion further including means for attaching said sensor mount to said air intake system with salad air flow conduit having an air flow therethrough indicative of the mass air flow in said air intake system; and
   a mass air flow sensor having electronics and a sensor head for detecting the mass air flow through said air flow conduit, said mass air flow sensor having a base portion housing said electronics, and a sensing head extending from said base portion through said sensor head aperture and through said through bore into said internal passageway of said air flow conduit, said base portion of said mass air flow sensor being mounted on said flat mounting base portion of said sensor mount to form said mass air flow sensor assembly.

2. The mass air flow sensor assembly of claim 1 wherein said sensing head of said mass air flow sensors has an enlarged portion adjacent to said base portion and wherein said flat mounting plate portion of said sensor mount has a depressed well receiving said enlarged portion of said sensing head.

3. The mass air flow sensor assembly of claim 2 wherein said base portion of said mass air flow sensor has at least two spatially separated locating apertures, and wherein said mounting plate portion of said sensor mount has two locating pins receivable in said locating apertures to accurately align said sensing head in said internal passageway of said air flow conduit.

4. The mass air flow sensor assembly of claim 3 further comprising cap rivets receivable in apertures provided in the ends of said at least two spatially separated locating pins to secure said mass air flow sensor to said sensor mount.

5. The mass air flow sensor assembly of claim 2 further comprising an O-ring seal circumscribing said sensing head, said depressed well further comprising an O-ring seat provided adjacent to the bottom of said depressed well sealingly engaging said O-ring seal to pneumatically seal said through bore.

6. The mass air flow sensor assembly of claim 1 further comprising:
   a first pair of spatially separated apertures provided through said mass air flow sensor;
   a second pair of spatially separated apertures provided through said mounting plate portion of said sensor mount, each aperture of said second pair of apertures in axial alignment with a respective aperture of said first pair of apertures; and
   a fastener receivable through each axially aligned aperture of said first and second pair of apertures to secure said mass air flow sensor and said sensor mount to the air intake system of the internal combustion engine.

7. The mass air flow sensor assembly of claim 1 wherein said air intake system includes a sensor housing having a main air flow passageway, said means for attaching includes means for attaching said mass air flow sensor assembly to said sensor housing with said air flow conduit disposed in said main air flow passageway.

8. A sensor mount for mounting a mass air flow sensor to an air intake system of an internal combustion engine, said mass air flow sensor having a substantially flat base housing the electronics and a sensing head projecting from said base, said sensor mount comprising:
   a mounting plate portion attachable to said air intake system, said mounting plate portion having a depressed well receiving therein a first portion of said sensing head, said depressed well having an aperture through which a remaining portion of said sensing head passes, said mounting plate portion further including means for fixedly mounting said base of said mass air flow sensor on said sensor mount;
   an air flow conduit portion having an internal passageway extending therethrough substantially parallel to said mounting plate portion; and
   a neck portion connecting the bottom of said depressed well to said air flow conduit, said neck portion having a through bore concentric with said aperture permitting a remaining portion of said sensing head to extend into said internal passageway.

9. The sensor mount of claim 8 further comprising at least one locating pin provided on said mounting plate portion which mates with a locating aperture provided in said base of said mass air flow sensor to properly orient said sensing head in said internal passageway.

10. The sensor mount of claim 9 wherein said at Least one locating pin comprises two locating pins and said base of said mass air flow sensor has two locating apertures.

11. The sensor mount of claim 10 wherein said locating pins have apertures provided at the end opposite said mounting plate portion for receiving rivets to secure said base of said mass air flow sensor to said mounting plate portion.

12. The sensor mount of claim 10 wherein said base portion of said mass air flow sensor has at least two mounting apertures for receiving fasteners therethrough, said mounting plate portion has a through aperture axially aligned with a respective one of each of said at least two mounting apertures.

13. The sensor mount of claim 10 further comprising an air flow web provided on each side of said neck portion parallel to an axis of symmetry of said internal passageway to reduce the air turbulence in the vicinity of said air flow conduit.

14. The sensor mount of claim 10 wherein said mass air flow sensor has an O-ring circumscribing said sensing head, and said mounting plate portion has an annular O-ring seat provided in said depressed well sealingly engageable with said 0-ring.

* * * * *